(12) United States Patent
Gibb et al.

(10) Patent No.: US 12,222,892 B2
(45) Date of Patent: Feb. 11, 2025

(54) ROUTING DATA BETWEEN PROCESSING UNITS INDENTIFIED BY A SEQUENTIALLY ORDERED LIST OF A PACKET PREFIX

(71) Applicant: EIDETIC COMMUNICATIONS INC., Calgary (CA)

(72) Inventors: Sean Gregory Gibb, Calgary (CA); Saeed Fouladi Fard, Calgary (CA)

(73) Assignee: Eidetic Communications Inc., Calgary (CA)

( * ) Notice: Subject to any disclaimer, the term of this patent is extended or adjusted under 35 U.S.C. 154(b) by 165 days.

(21) Appl. No.: 17/842,129

(22) Filed: Jun. 16, 2022

(65) Prior Publication Data
US 2023/0359581 A1 Nov. 9, 2023

(30) Foreign Application Priority Data
May 9, 2022 (WO) ............... PCT/CA2022/050724

(51) Int. Cl.
*G06F 15/163* (2006.01)
*G06F 9/38* (2018.01)

(52) U.S. Cl.
CPC .......... *G06F 15/163* (2013.01); *G06F 9/3877* (2013.01)

(58) Field of Classification Search
CPC ................ G06F 9/3877; G06F 15/163; G06F 15/17306; G06F 15/173; G06F 15/17312; H04L 45/00
See application file for complete search history.

(56) References Cited

U.S. PATENT DOCUMENTS

| | | | |
|---|---|---|---|
| 7,925,863 B2* | 4/2011 | Hundley | G06F 9/4843 712/34 |
| 10,432,506 B2* | 10/2019 | Chen | G06F 9/4881 |
| 2009/0083606 A1 | 3/2009 | Choi et al. | |
| 2013/0054850 A1 | 2/2013 | Co | |
| 2016/0028640 A1* | 1/2016 | Zhang | H04L 67/561 370/389 |
| 2017/0149632 A1* | 5/2017 | Saltsidis | H04L 45/306 |
| 2018/0091420 A1* | 3/2018 | Drake | H04L 45/033 |
| 2019/0012350 A1 | 1/2019 | Sindhu et al. | |
| 2019/0243571 A1 | 8/2019 | Narayanan et al. | |
| 2020/0159568 A1* | 5/2020 | Goyal | G06F 9/4843 |
| 2022/0255857 A1* | 8/2022 | Li | H04L 45/745 |

OTHER PUBLICATIONS

International Patent Application No. PCT/CA2022/050724, International Search Report and Written Opinion, dated Feb. 1, 2023.

* cited by examiner

*Primary Examiner* — David J. Huisman
(74) *Attorney, Agent, or Firm* — Borden Ladner Gervais LLP; Todd Keeler

(57) ABSTRACT

A system, and associated method, includes a plurality of data processing units, a target CPU, an interconnect unit that is separate from the target CPU and configured to receive a data payload and a prefix that includes a sequentially ordered list of the processing units that will perform the data operations and the sets of parameters to be used by each of the processing units, and based on the sequentially ordered list, the interconnect unit sends the data payload to a first processing unit, and receives back processed data, then sends the processed data to the subsequent processing unit, and receives back further processed data, and so forth until all of the data operations have been performed by the processing units set forth in the sequentially ordered list.

14 Claims, 10 Drawing Sheets

ROUTING DATA BETWEEN PROCESSING UNITS INDENTIFIED BY A SEQUENTIALLY ORDERED LIST OF A PACKET PREFIX

FIELD

The present disclosure relates to systems and methods for performing data processing.

BACKGROUND

Computational Storage Processors (CSPs), Computational Storage Drives (CSDs), and Computational Storage Arrays (CSAs) offer mechanisms to offload computationally intensive processes from Central Processing Units (CPUs) by moving the compute closer to the data. As storage services, such as compression, decompression, encryption, and erasure coding are moved into hardware such as the CPU or solid state drives (SSDs), the ability to format data, filter it, and analyze it becomes more critical. For example, analyzing the data right after decompression, close to the source utilizing a hardware device, such as an add-in card, located at or near the storage device itself provides offload to the CPU by eliminating the costly CPU cycles to format and filter the data, the Double Data Rate memory (DDR) by removing traffic from the memory subsystem, and Peripheral Component Interconnect express (PCIe) bus by filtering data before it is transferred across the bus. Almost every application can benefit from the offload of data operations, such as formatting, filter, and analytics. Most importantly, packet capture and relational databases benefit from formatting and filtering operations on data.

In a conventional CPU-based system that performs data processing operations with the assistance of offload accelerators, such as query analytics for example, a host CPU performs all data routing functions. Data for analysis may typically arrive in a DDR connected to the host CPU with an interrupt command sent to the host CPU to inform the host CPU that data is ready to be processed. The host CPU provides the data to a hardware-based processing element, such as an offload hardware accelerator or a Graphics Processing Unit (GPU), by setting up a Direct Memory Access (DMA) to the hardware-based processing element along with required control signals typically via a control plane path. The host CPU may either poll the hardware-based processing element to await job completion or will await an interrupt indicating the hardware-based processing element has completed the job. The host CPU may start other operations for previous or future tasks, if passive waiting, or may actively wait to reduce the latency for the current operation. When the hardware-based processing element notifies the host CPU of completion, the host CPU will set up a DMA to transfer the processed data back into the DDR so that the host CPU can either complete the operation or provide the data to the next hardware-based processing element in the sequence of operations. In a typical system, the hardware-based processing element may append data back to the host CPU to indicate conditions of the operation or may provide data back via a control plane operation that the CPU can access.

The process of transferring data from the DDR via a CPU-directed DMA to a hardware-based processing element, the hardware-based processing element performing an operation, and then the CPU reading the data back from the hardware-based processing element into the DDR via DMA is a typical software/hardware flow for controlling the flow of data in a conventional data processing system. In addition to tying up CPU resources through setting up DMAs to transfer data between elements, and the inefficiencies in CPU usage due to receiving interrupts or actively waiting for operations to be completed, these conventional data processing systems typically experience significant traffic flowing into and out of the DDR as data moves back and forth from hardware-based processing element. This traffic flow may also result in inefficiencies in the overall data processing system due to DDR bottleneck.

The hardware-based processing element may be implemented as logic in an Application Specific Integrated Circuit (ASIC) with an embedded target CPU, logic in a Field Programmable Gate Array (FGPA) with an embedded target CPU, or a discrete component system containing a general-purpose target CPU along with add-in cards including network interface cards, GPUs, ASICs, and FPGAs all connected via a standard interface such as PCIe. Managing the traffic in the hardware-based processing element is further complicated by the conventional implementation on these devices where additional locally-attached DDR is used to handle input data from the host CPU, and internal data managed by the target CPU to stage data for data processing elements, and output data.

Improvements in routing data in data processing systems and hardware-based processing elements are desirable.

BRIEF DESCRIPTION OF THE DRAWINGS

Embodiments of the present disclosure will now be described, by way of example only, with reference to the attached drawings.

DETAILED DESCRIPTION

Figure 1:
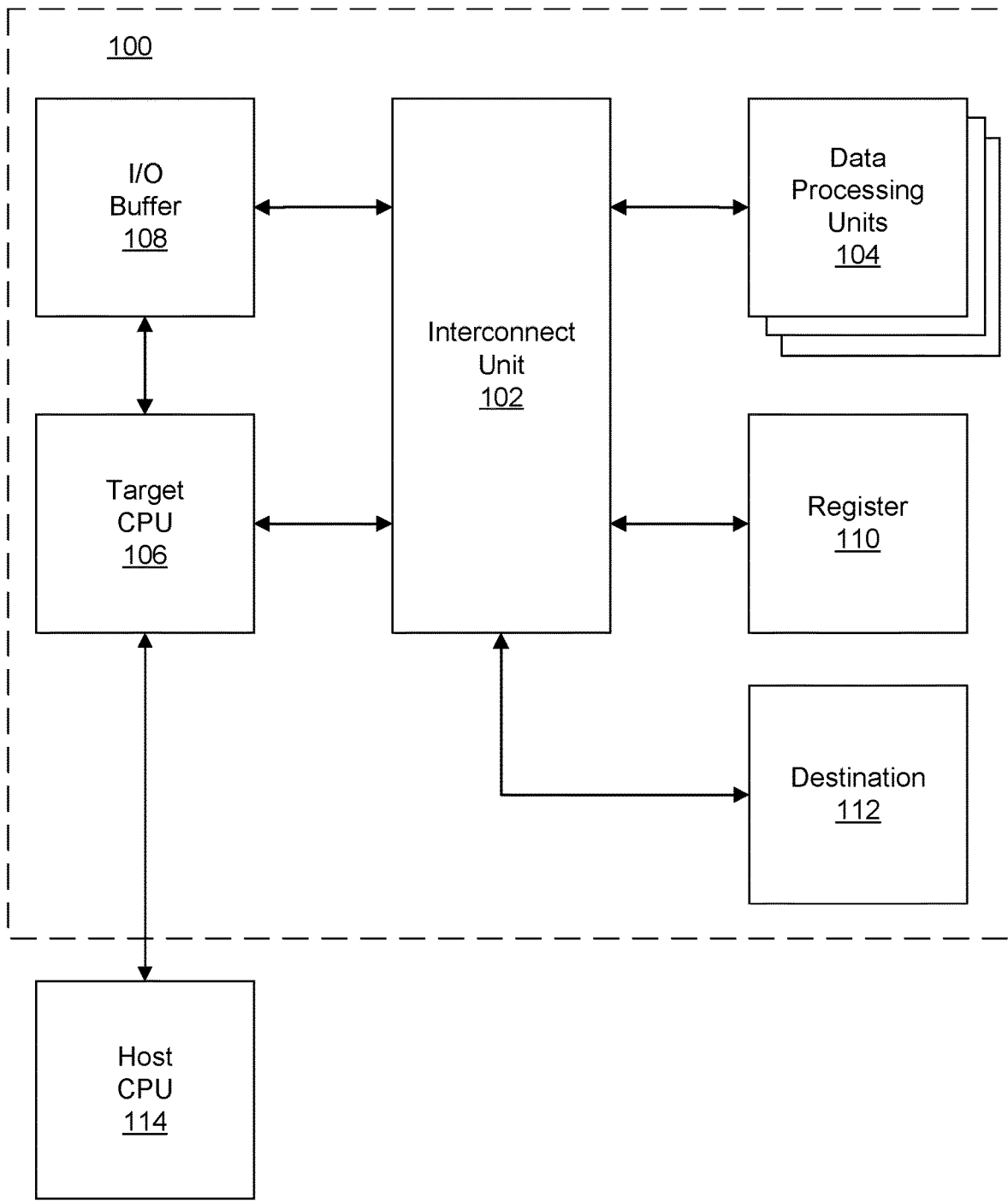
FIG. 1 is a schematic representation of an example data processing system in accordance with an embodiment of the present disclosure.

Embodiments of the present disclosure relate to a data processing system and a method for a data processing system in which data routing between data processing units is performed by an interconnect unit that is separate from a target CPU, offloading the data routing from the target CPU in order to address at least some of the problems of conventional data processing systems. In embodiments of the present disclosure, a data payload is received at the interconnect unit that includes the data for processing and a prefix that includes a sequentially ordered list of the processing units that will perform the data operations and the sets of parameters to be used by each of the processing units.

Based on the sequentially ordered list included in the prefix, the interconnect unit sends the data a first processing unit, and receives back the processed data, then send the processed data to the subsequent processing unit, and receives back further processed data, and so forth until all of the data operations set forth in the sequentially ordered list have been performed. Each processing unit may append a postfix to the data payload, information related to a status of the data operation performed by that processing unit. Once all data operations have been performed, the interconnect unit may send the processed data along with the postfix to a destination.

By having data flows controlled by an interconnect unit, separate from the target CPU, the present disclosure frees up CPU resources and may reduce, and potentially eliminate, reads and writes from and to the DDR between data processing operations, reducing the DDR bottleneck issues compared to conventional data processing systems.

In an embodiment, the present disclosure provides a data processing system for performing a sequence of data operations includes a plurality of data processing units each configured to perform a respective data operation, a target CPU configured to generate a current prefix, the current prefix including a current sequentially ordered list of the plurality of data processing units corresponding to the sequence of data operations, an interconnect unit that is separate from the target CPU, the interconnect unit in communication with the plurality of data processing units and the target CPU, the interconnect unit configured to receive from the target CPU the generated prefix, receive from an input data source a current data payload to be processed, generate a current data packet by prepending the current prefix to the current data payload, sequentially send the data packet to the plurality of data processing units by the interconnect unit being configured to i) determine, based on a next entry in the current sequentially ordered list included in the current prefix of the current data packet, a one of the plurality of data processing units associated with the next entry, ii) remove the next entry and the associated set of parameters associated from the current prefix to generate an updated prefix, iii) replace the current prefix with the updated prefix in the current data packet, iv) send the current data packet to the one of the plurality of data processing units associated with the next entry in the current sequentially ordered list included in the current prefix, together with the set of parameters associated with the next entry, the current data packet including a current data payload for processing, v) receive from the one of the plurality of data processing units an updated data packet including the updated prefix and a processed data payload generated by the one of the plurality of data processing units using the current data payload and the set of parameters, vi) in response to determining that a next entry in the updated prefix is associated with any of the plurality of data processing units, repeat steps i) to v) using the updated data packet as the current data packet with the updated prefix being the current prefix, and vii) in response to determining that a next entry in the updated prefix associated with a data destination, remove the next entry from the updated prefix in the updated data packet and send the updated data payload with the next entry removed to the destination.

In an example embodiment, each of the plurality of data processing units are configured to receive the current data packet and the set of parameters from the interconnect unit, perform a data operation on the current data payload included in the current data packet to generate the processed data payload, and send the updated data packet including the processed data payload and the updated prefix to the interconnect unit.

In an example embodiment, the current prefix includes a set of parameters for each entry in the currently sequentially ordered list, the interconnect unit configured to send the current data packet to the one of the plurality of data processing units associated with the next entry comprises the interconnect unit configured to send the current data packet to the one of the plurality of data processing units associated with the next entry together with the set of parameters associated with the next entry, and the one of plurality of data processing units being configured to perform a data operation on the current data payload comprises the one of the plurality of data processing units being configured to perform the data operation utilizing a set of parameters.

In an example embodiment, each of the plurality of data processing units are further configured to generate a postfix that includes information associated with a status of the data operation performed by the data processing unit, and each of the plurality of data processing units being configured to send the updated data packet to the interconnect unit comprises each of the plurality of data processing units sending the postfix together with the processed data payload and the updated prefix as the updated data packet.

In an example embodiment, the current data packet includes a current postfix, the interconnect unit being configured to send the current data packet to the one of the plurality of data processing units associated with the next entry comprises sending the current data payload, the updated prefix, and the current postfix, and each of the plurality of data processing units being configured to generate the postfix comprises adding a postfix that includes information associated with a status of the data operation performed by the data processing unit to the current postfix received from the interconnect unit to generate an updated postfix.

In an example embodiment, the interconnect unit being configured to receive the updated data packet from the one of the plurality of data processing units comprises the interconnect unit being configured to receive the updated postfix together with the processed data payload and the updated prefix as the updated data packet, and the interconnect unit being configured to repeat steps i) to v) using the updated data packet as the current data packet with the updated prefix being the current prefix comprises the interconnect unit being configured to repeat steps i) to v) using the updated postfix received from the one of the plurality of data processing units as the current postfix in the current data packet.

In an example embodiment, at least one of the plurality of data processing units is further configured to revise the updated prefix received from the interconnect unit to generate a revised prefix, the revised prefix including at least one of a revised sequentially ordered list or a revised set of parameters associated with an entry in the sequentially ordered list, and the at least one of the plurality of data processing units being configured to send the updated data packet including the processed data and the updated prefix to the interconnect unit comprises including the revised prefix as the updated prefix in the processed data packet.

In an example embodiment, each entry in the sequentially ordered list comprises an address of the one of the plurality of data processing units associated with that entry.

In an example embodiment, the address of the one of the plurality of data processing units associated with that entry comprises a port number associated with a port of the interconnect device that is connected to the one of the plurality of data processing units associated with that entry.

In an example embodiment, the plurality of data processing units comprise two or more data processing units configured to perform a same data operation, an address in the sequentially ordered list is a virtual address associated with the same operation, and when the next entry in the sequentially ordered list comprises the virtual address, the interconnect unit being configured to send the current data packet to the one of the plurality of data processing units associated with the next entry in the current sequentially ordered list comprises the interconnect unity being configured to determine an available one of the two or more data processing units configured to perform the same data operation, replace the virtual address in the next entry with an actual address of the available one of the two or more data processing units configured to perform the same operation, and send the current data packet that includes the actual address to the available one of the two or more data processing units.

In another embodiment, the present disclosure provides a method for performing a sequence of data operations in a data processing system having a target CPU, an interconnect unit separate from the target CPU, and a plurality of data processing units, the method includes generating, by the target CPU, a current prefix, the current prefix including a current sequentially ordered list of the plurality of data processing units corresponding to the sequence of data operations, receiving, at the interconnect unit, the current prefix from the interconnect unit, receiving, at the interconnect unit, from an input data source a current data payload to be processed, generating, by the interconnect unit, a current data packet by prepending the current prefix to the current data payload, sequentially sending, by the interconnect unit, the data packet to the plurality of data processing units by: i) determining, by the interconnect unit, based on a next entry in the current sequentially ordered list included in the current prefix of the current data packet, a one of the plurality of data processing units associated with the next entry, ii) removing, by the interconnect unit, the next entry and the associated set of parameters associated from the current prefix to generate an updated prefix, iii) replacing, by the interconnect unit, the current prefix with the updated prefix in the current data packet, iv) sending, by the interconnect unit, the current data packet to the one of the plurality of data processing units associated with the next entry in the current sequentially ordered list included in the current prefix, together with the set of parameters associated with the next entry, the current data packet including a current data payload for processing, v) receiving, by the interconnect unit, from the one of the plurality of data processing units an updated data packet including the updated prefix and a processed data payload generated by the one of the plurality of data processing units using the current data payload and the set of parameters, vi) in response to determining that a next entry in the updated prefix is associated with any of the plurality of data processing units, repeating, by the interconnect unit, steps i) to v) using the updated data packet as the current data packet with the updated prefix being the current prefix, and vii) in response to determining that a next entry in the updated prefix associated with a data destination, removing, by the interconnect unit, the next entry from the updated prefix in the updated data payload and sending, by the interconnect unit, the updated data packet with the next entry removed to the destination.

In an example embodiment, receiving, by the one of the plurality of processing units, the current data packet and the set of parameters from the interconnect unit, performing, by the one of the processing units, a data operation on the current data payload included in the current data packet to generate a processed data payload, and sending, by the one of the plurality of processing units, the updated data packet including the processed data payload and the updated prefix to the interconnect unit.

In an example embodiment, the current prefix includes a set of parameters for each entry in the currently sequentially ordered list; sending, by the interconnect unit, the current data packet to the one of the plurality of data processing units associated with the next entry comprises sending the current data packet to the one of the plurality of data processing units associated with the next entry together with the set of parameters associated with the next entry, and performing, by the one of the processing units, a data operation on the current data payload comprising performing the data operation utilizing the set of parameters.

In an example embodiment, generating, by the one of the plurality of processing units, a postfix that includes information associated with a status of the data operation performed by the data processing unit, and wherein sending, by the one of the plurality of processing units, the updated data packet to the interconnect unit comprises sending the postfix together with the processed data payload and the updated prefix as the updated data packet.

In an example embodiment, the current data packet includes a current postfix, sending the current data packet to the one of the plurality of data processing units associated with the next entry comprises sending, by the interconnect unit, the current data payload, the updated prefix, and the current postfix, and generating the postfix comprises adding, by the one of the plurality of processing units, a postfix that includes information associated with a status of the data operation performed by the data processing unit to the current postfix received from the interconnect unit to generate an updated postfix.

In an example embodiment, receiving the updated data packet from the one of the plurality of data processing units comprises receiving, by the interconnect unit, the updated postfix together with the processed data payload and the updated prefix as the updated data packet, and repeating steps i) to v) using the updated data packet as the current data payload with the updated prefix being the current prefix comprises repeating, by the interconnect unit, steps i) to v) using the updated postfix received from the one of the plurality of data processing units as the current postfix in the current data payload.

In an example embodiment, the method further includes, during at least one of the data operations, revising, by the one of the plurality of processing units, the updated prefix received from the interconnect unit to generate a revised prefix, the revised prefix including at least one of a revised sequentially ordered list or a revised set of parameters associated with an entry in the sequentially ordered list, and wherein sending the updated data packet including the processed data and the updated prefix to the interconnect unit comprises including, by the one of the plurality of data processing units, the revised prefix as the updated prefix in the processed data packet.

In an example embodiment, each entry in the sequentially ordered list comprises an address of the one of the plurality of data processing units associated with that entry.

In an example embodiment, the address of the one of the plurality of data processing units associated with that entry comprises a port number associated with a port of the interconnect device that is connected to the one of the plurality of data processing units associated with that entry.

In an example embodiment, the plurality of data processing units comprise two or more data processing units configured to perform a same data operation, an address in the sequentially ordered list is a virtual address associated with the same operation performed by the two or more data processing units, and when the next entry in the sequentially ordered list comprises the virtual address, sending the current data packet to the one of the plurality of data processing units associated with the next entry in the current sequentially ordered list comprises determining, by the interconnect unit, an available one of the two or more data processing units configured to perform the same data operation, replacing the virtual address in the next entry with an actual address of the available one of the two or more data processing units configured to perform the same operation, and sending the current data packet to the available one of the two or more data processing units.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described.

Two commonly utilized options to address the issue of DDR bottleneck issues in conventional, CPU-centric data processing systems are described below. Both options results in increased power consumption and still may potentially be susceptible to data bottleneck issues. The first, and most common option owing to its simplicity, is to use a high bandwidth memory (HBM) as the DDR to facilitate a greater volume of traffic into and out of the DDR. The trade-off with this option is that HBM is power-intensive, and despite the increased bandwidth may still result in bottleneck issues when too many processes require data into and out of the DDR at a given time, particularly when such data relates with localized data traffic within the data processing system. A second option is to use on-chip Static Random Access Memory (SRAM) to hold data between hardware-based processing elements. However, SRAM has the issue of generally only being able to support small amounts of data and increasing the power.

From a state machine perspective, a target CPU has a state machine programmed in the software that may execute one step of a data processing chain at a time. In the conventional CPU-centric data processing systems described previously, these steps include sending data to a processing unit, such as local logic on the same device or a hardware-based accelerator, and awaiting a response back before moving to the next step of the processing chain. To efficiently use the target CPU in such conventional CPU-centric data processing systems, the target CPU may perform other tasks during this waiting period, rather than sitting idle. However, this requires that the target CPU must determine whether the next step in the processing chain can be performed. This leads to a processing inefficiency because the target CPU either must keep checking back periodically to determine whether the data processing unit is finished processing the data, or must be interrupted in the middle of another task to be notified that the data processing unit is finished, both of which are detrimental to the performance.

In embodiments of the present disclosure, the target CPU provides interconnect unit, separate from the target CPU, with a simplified state machine that describes all the states that will be executed in the processing chain, and the interconnect unit performs the scheduling of the states by automatically transitioning from state to state, i.e., passing the data between the data processing units, without waiting for input from a CPU to determine when the process can proceed to the next state. The simplified state machine in embodiments of the present disclosure may be in the form of a data format comprising a prefix, data payload, and optionally a postfix. The data prefix includes a sorted sequence of addresses of every data processing unit to be visited from initial data source to the final destination of the resulting processed data. In addition, the prefix may include a sorted set of parameters utilized to perform the data operations for each state. Utilizing the data prefix, the interconnect device is able to route data directly between processing units, without further input from the target CPU and without transmitting data to the DDR between operations. Further, because data is transmitted by the interconnect unit directly between data processing units, SRAM is not necessary to hold data between operations.

Referring to FIG. 1, an example data processing system 100 is shown that is configured to address at least some of the issues with conventional CPU-centric data processing systems. As will be described in more detail below, one context in which the data processing system 100 may be utilized is to perform query and analytics processing on the data.

The data processing system 100 includes an interconnect unit 102 and plurality of data processing units 104. The data processing units 104 may be, for example, hardware accelerators that are each configured to perform a particular data operation.

The interconnect unit 102 controls routing data between the various components of the overall system shown in FIG. 1, which in addition to the data processing system 100 may include an target CPU 106, an input/output (I/O) buffer 108, and a register bank 110.

The target CPU 106 may be an embedded RISC-V-based or ARM-based processor or a general-purpose processor such as an Intel-based processor. The I/O buffer 108 may be provided for staging data and allowing data access to the target CPU for data processing purposes and may be any suitable source of input data, including, for example, any memory, including a target CPU 106 accessible on-chip memory. The register bank 110 may be accessible by the target CPU 106 and data processing units 104 to provide low latency access to control, configuration, and feedback signals. The control, configuration, and feedback signals may be utilized to provide information to the target CPU 106 or to the data processing units 104, including feedback from the target CPU 106 or data processing units 104 to, for example, configure the data processing units 104 or to provide the target CPU 106 with some basic telemetry from the data processing units 104. The control, configuration, and feedback signals may be utilized to provide non-runtime configuration, i.e. one-time initialization, if any data processing units 104 or the software included in such data processing units 104 allows such offline configuration.

The interconnect unit 102 is configured to send the data between a source, such as the I/O buffer 108, through multiple data processing units 104 before the end processed data is sent to a destination 112. The destination 112 may be local, such as, for example a component included on a chip that provides the data processing system 100 when the data processing system 100 is provided in a single integrated circuit. In other examples, the destination 112 may be connected to the interconnect unit 102 over a network. The destination 112 may be a peer device on a PCIe bus, or the target CPU 106. The destination 112 may be, for example, a removable device that may be, for example, connected and disconnected from the data processing system 100.

Routing of the data between the various data processing units 104 and to the destination 112 is performed by the interconnect unit 102 using a data format comprised of a prefix, data payload, and optionally a postfix. Use of this data format facilitates the interconnect unit 102 performing data routing independent of the target CPU 106, which frees up processing resources of the target CPU 106 and also reduces bottleneck issues at a DDR associated with the target CPU 106.

The prefix may be generated and prepended to the initial data payload by the interconnect unit 102. The initial data payload may originate from an input data source such as, for example, the I/O buffer 106 or storage memories. The data prefix includes a sequentially ordered list of addresses of every block to be visited from the initial data source to the destination of the resulting processed data. In addition, the prefix may include a set of parameters associated with each of the entries in the sequentially ordered list of addresses. The sets of parameters may include messages or addresses, to be passed to each of the blocks visited. The prefix may include a field that indicates how long the prefix is.

The interconnect unit 102 may communicate with one or more of the other components of the data processing system 100, including the data processing units 104, the target CPU 106, the I/O buffer 108, and a destination 112 over a network. The network may be any suitable wide area network (WAN) or local area network (LAN) or combination of a WAN and a LAN. In these examples, the addresses included in the sorted sequence of addresses will be the network address of the elements that the interconnect unit 102 connects with via the network.

Some elements, including some or all of the data processing units 104, the I/O buffer 108, and a destination 112 may be included with the interconnect unit 102 in a single integrated circuit. In these examples, each such element included in the integrated circuit is connected to the interconnect unit 102 via a unique port number of the interconnect unit 102. In these examples, the addresses included in the sorted sequence of address for these elements included in the integrated circuit are the port numbers assigned to these elements.

The target CPU 106 may communicate with a host CPU 114. The host CPU 114 may control a larger overall computing system that includes the data processing system 100. The host CPU 114 may provide commands to the target CPU 106 for initiating data operations to be performed by the data processing system 100.

When a data processing system is included in within a larger overall computing system, the target CPU 106 may provide the host CPU with the different processes that the data processing system 100 is configured to perform, and cache identifiers will be enumerated for each process. In an example, the target CPU 106 may generate and cache routes for sequential data processing steps to perform specific data operations and store each route in the register 110 as a cached route identifier. The host CPU may then include in subsequent commands to the target CPU 106 the cache identifier associated with a desired process in order to initiate the process being performed by the data processing system 100. A process having a cache identifier may comprise multiple different data operations performed by multiple data processing units 104, or may be a single data operation performed by a single data processing unit 104.

In some examples, the data processing units 104 may include two or more data processing units 104 that are configured to perform the same data operation. In this case, each of these redundant data processing units 104 will have a unique address or port number, as the case may be. The prefix entry associated with a data operation may include a virtual address or port number that is associated with the data operation, rather than with a particular data processing unit 104. In this case, the interconnect unit 102 may allocate one of the redundant data processing elements 104 to perform the data operation. This allocation may be based, at least in part, on which data processing unit 104 is available to perform the data operation. Once a particular data processing unit 104 is allocated, the interconnect unit 102 may revise the prefix to replace the virtual address or port number associated with the data operation with the actual address or port number associated the allocated data processing unit 104.

Optionally, a postfix may be appended to the data payload by each of the data processing units 104 that the payload passes through. The postfix may be utilized to return messages on the status of each of the operations. For example, each data processing unit 104 may return a flag in the postfix indicating that the current data processing unit 104 may or may not be the final of a sequence. In another example, the postfix appended by a data processing unit 104 indicates whether the operation performed by that data processing unit was successful or not. Like the prefix, the postfix may include a field that indicates how long the postfix is.

By using the data transfer and control aware interconnect unit 102, the data processing system 100 reduces issues related to DDR bottleneck because, unlike the conventional CPU-centric systems described previously, data is not transferred back and forth to the DDR/HBM and data processing units 104 between each data operation step. In addition, unlike the CPU-centric systems described previously in which large SRAMs may be utilized to store data while awaiting a DMA command from the CPU for the next data operation, the prefixes included with the data payload inform the interconnect unit 102 of the next destination such that the interconnect unit 102 may immediately route the data to a next destination block in the chain, such as a next data processing unit 104 or destination 112, without storing data in a SRAM. Further, because data is automatically transferred between data processing units 104 by the interconnect unit 102 without further input from the target CPU 106, target CPU 106 resources are freed up for other tasks, and the overall efficiency of the target CPU 106 is increased by, either, reducing the number of interrupts received at the target CPU 106 or avoiding the target CPU 106 from having to periodically determine if data operations being performed by data processing units 104 have been completed, or both.

Figure 2A:
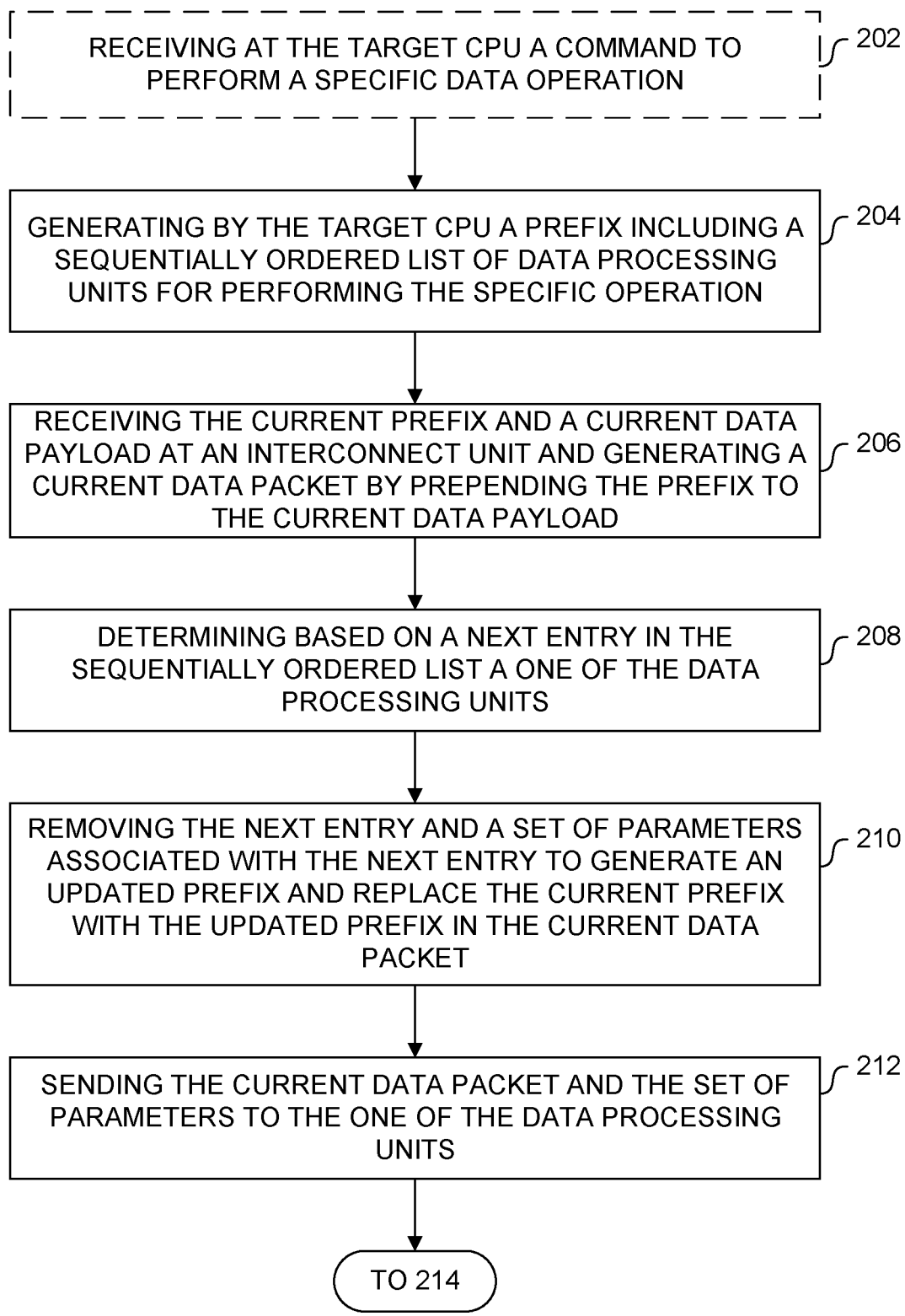
FIGS. 2A-2C show a flow chart of an example method of performing a sequence of data operations in accordance with an embodiment of the present disclosure.
Figure 2B:
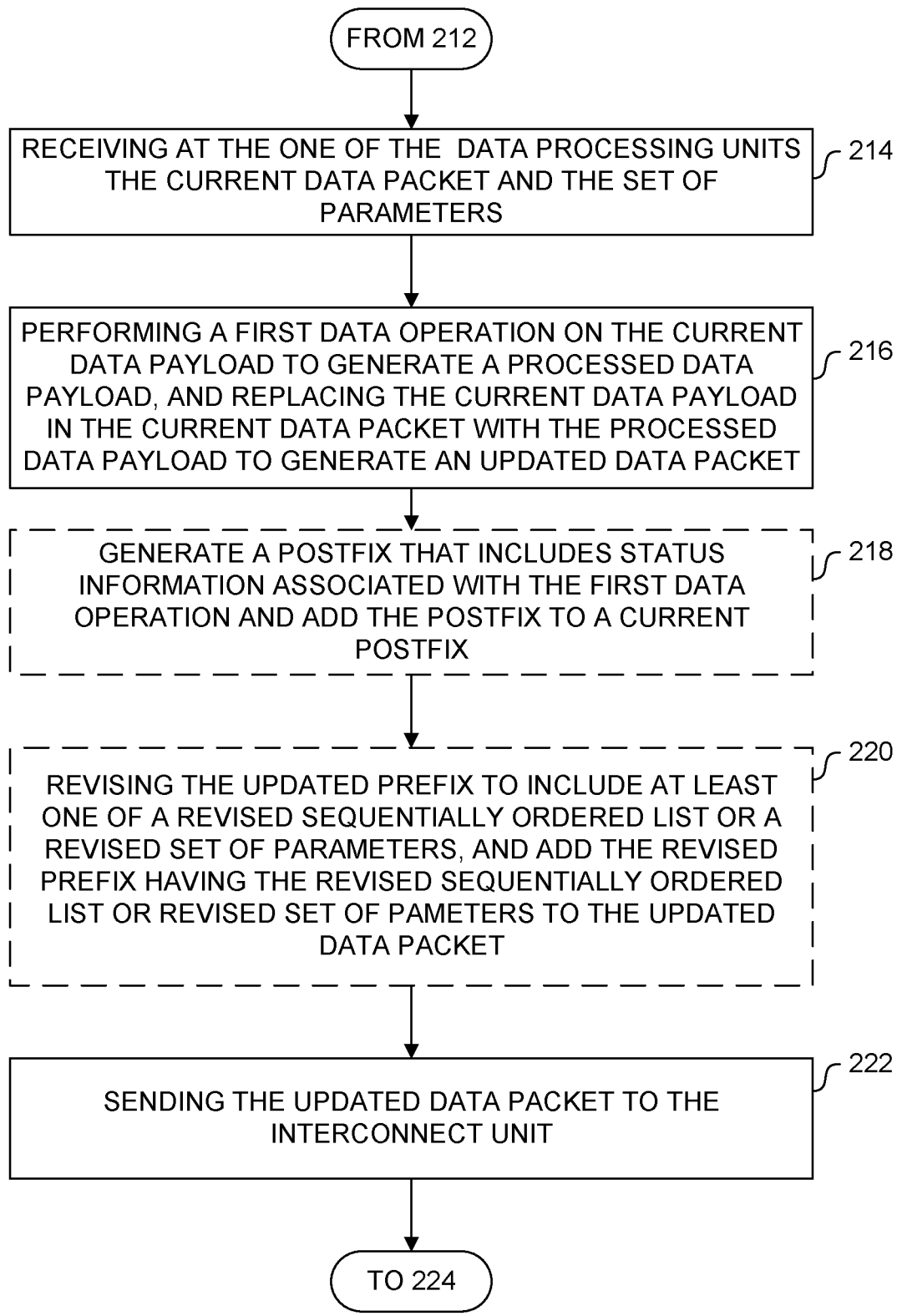
Figure 2C:
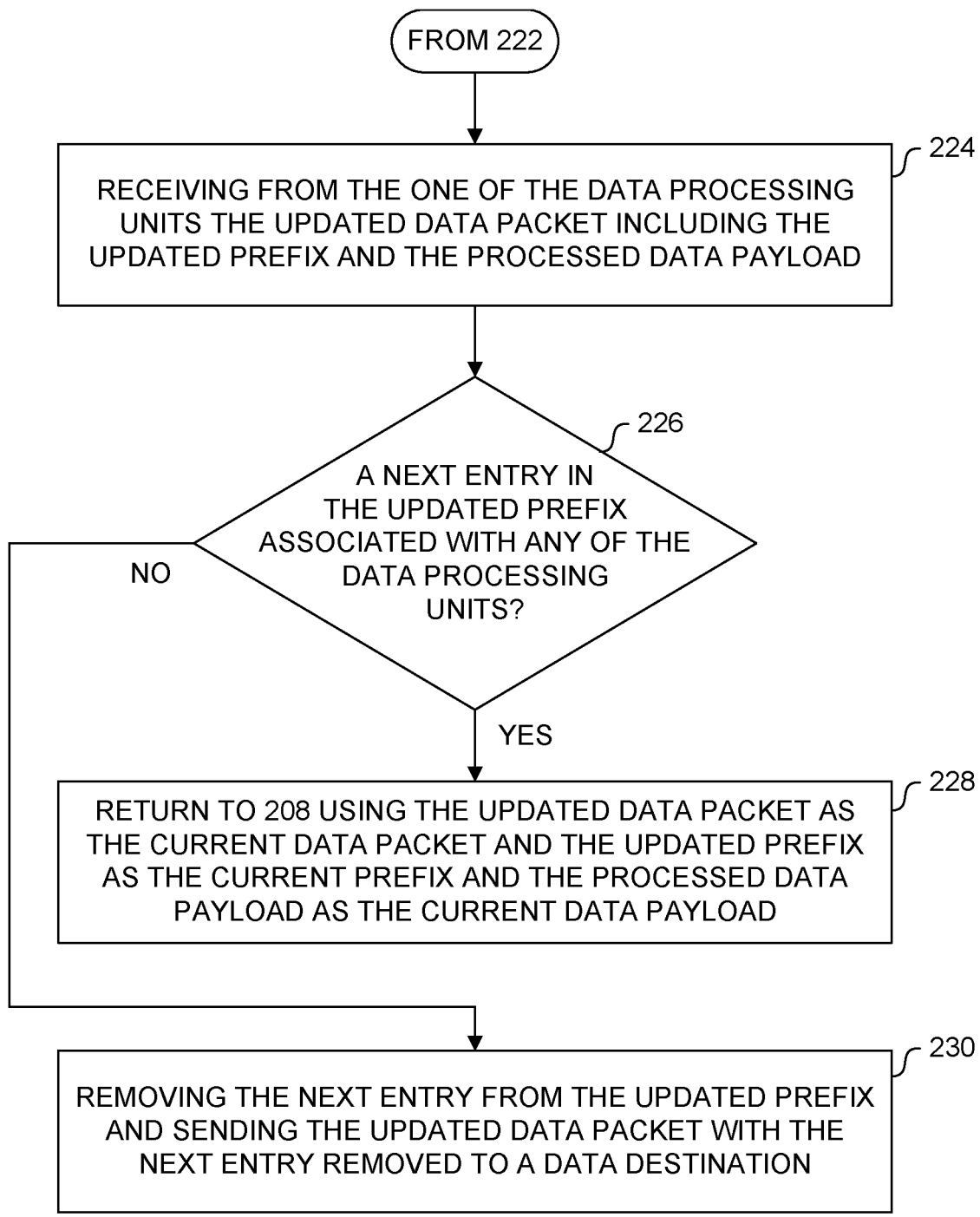

Referring to FIG. 2, a flow chart illustrating an example method of performing a sequence of data operations utilizing a data processing system, such as the example data processing system 100, is shown. The method may be performed by one or more processors included in components of a data processing system, such as data processing system 100, such as, for example, processors included in the interconnect unit 102 and the data processing unit 104, as well as processors including a CPU, such as target CPU 106, or a data source, such as the I/O Buffer 108, or both. Different portions of the method may be performed by the processors of the different components of the data processing system.

The method may optionally begin at 202 with the target CPU receiving a command from the host CPU to perform a specific data operation on a particular data payload. The command may be accompanied by the particular data payload, or an address at which the particular data payload may be obtained, such as, for example, in the I/O buffer 108. The command may include a cache identifier associated with the specific data operation to be performed. The specific data operation may require performing multiple data operations by multiple data processing units, as described previously. An example of a specific data operation is a query and analysis operation, which is described in more detail below.

At 204, the target CPU may generate a prefix that includes a sequentially ordered list of the plurality of data processing units to perform each of the multiple data operations. Optionally, the prefix generated by the target CPU may include a set of parameters associated with each entry in the sequentially ordered list, which are parameters to be utilized by each of the plurality of data processing units to perform its respective data operation. The sequentially ordered list includes the addresses of the plurality of data processing units and associated sets of parameters. The current prefix may be generated utilizing, for example, a data route included in the comment received from the target CPU, whether the data route is cached or included within the command received from the host CPU.

At 206, the prefix is received at the interconnect unit, which may be substantially similar to the interconnect unit 102 described previously. The interconnect unit 102 may obtain the data payload on which the specific data operation is to be performed from, for example, an I/O buffer, such as I/O buffer 108 described previously, which data payload becomes the current data payload. The interconnect unit then generates a current data packet that comprises the current data payload and a current prefix that comprises the prefix received from the target CPU.

The interconnect unit then sequentially provides the data payload to the various data processing units so that the data operations may be performed on the data in the desired order, as set out in the sequentially ordered list included in the current prefix.

At 208, the interconnect unit determines, based on a next entry in the current sequentially ordered list in the current prefix, a one of the plurality of data processing units. In an example, each entry of the sequentially ordered list of the plurality of data processing units may include the address of the particular data processing unit that is to perform the data operation associated with that entry. As set out above, the address may be a port number of the interconnect unit that indicates the port of the interconnect unit that connects to a particular on-chip, or off-chip, data processing unit, or the address may be a network address for a remote data processing unit. Determining the one of the plurality of data processing elements at 208 then comprises determining the address that the current data packet is to be sent to.

In some examples, more than one of the plurality of data processing units may be configured to perform a same data operation. In this example, rather than the address of a particular data processing unit, one or more of the entries in the sequentially ordered list of the plurality of data processing units may be a "virtual address" that is associated with a particular data operation that may be performed by more than one of the plurality of data processing units are configured to perform. In this example, determining at 208 may include the interconnect unit determining which of the more than one data processing units to utilize to perform the data operation associated with the virtual address. Once determined, the interconnect unit may replace the virtual address in the current prefix with the actual address of the selected data processing unit.

At 210, the next entry and the set of parameters associated with the next entry are removed from the current prefix to generate an updated prefix, and the current prefix in the current data packet is replaced with the updated prefix.

At 212, the current data packet, with the updated prefix, is sent to the one of the plurality of data processing units together with the set of parameters that was removed at 210.

Although the present example describes removing the next entry prior to the sending the current data packet to the one of the plurality of data processing units, in other examples, the next entry may be removed after the processed data is returned to the interconnect unit from the one of the plurality of data processing units.

At 214, the current data packet and the set of parameters are received at the one of the data processing units.

At 216, the one of the plurality of data processing units performs the data operation on the current data payload included in the current data packet. The data operation may be performed utilizing the set of optional parameters received from the interconnect unit if such parameters are included in the prefix associated with this operation. The data operation performed by the data processing unit generates a processed data payload. The current data payload in the current data packet is replaced with the processed data payload to generate an updated data packet that includes the updated prefix, and the processed data payload.

At 218, the data processing unit may optionally generate a postfix that includes status information related to the data operation that was performed to generate the processed data payload. The status information that is included in the optional postfix may depend on the data operation that was performed. The status information may indicate, for example, that the data operation was successfully completed. If the data operation was a compression operation, the status information may include, for example, the amount of output data and the compression ratio that resulted from the compression operation.

The generated postfix may be added to the updated data packet. If the current data packet received at the data processing unit included a current postfix, then adding the postfix at 218 may comprise adding the postfix generated by the data processing unit as a new entry to the end of the current postfix.

Optionally at 220, the data processing unit may determine that a sequence of data operations that differs from sequenced list included in the updated prefix is desired, and may revise the updated prefix to generate a revised prefix. The revised prefix may include a revised sequentially ordered list of the plurality of data processing elements, or revised sets of parameters associated with the entries in the sequentially ordered list, or both a revised list and revised sets of parameters. The revised prefix is then added by the data processing unit to the updated data packet, replacing the previous updated prefix that was received from the interconnect unit.

The decision-making process for the optional prefix revision determined at 220 may be controlled by, for example, machine learning algorithms, custom hardware, or software implemented in the data processing unit. In some examples, the data processing unit's sole purpose may be to revise the prefix in order to reschedule the different data operations included in the sequential list based on, for example, the data payload that is received or based on results included in a postfix attached to the current data packet received at the data processing unit.

In an example, the current data payload received in the current data packet may be in a format that the data processing unit is not configured to operate on. In this case, the data processing unit may add an additional entry at the beginning of the prefix of the current data packet that is associated with a data processing unit that is configured to reformat data into a format that the current data processing unit is configured to operation on. This is described in more detail below with reference to the examples.

At 222, the updated data packet is sent to the interconnect unit. At 224, the interconnect unit receives the updated data packet.

At 226, the interconnect device determines if a next entry in the updated prefix of the updated data packet, or in the revised prefix in the case in which the data processing unit has revised the updated prefix, is associated with any of the plurality of data processing units.

If the determination at 226 is yes, the next entry is associated with one of the plurality of data processing units, then there are further data operations to be performed. In this case, the method proceeds to 228 in which the method returns to 208 with the updated data packet received at 224 becoming the new current data packet that is utilized at 208.

If the determination at 226 is no, the next entry in the updated prefix of the updated data packet, or in the revised prefix in the case in which the data processing unit has revised the updated prefix, then the data operations have been completed and the next entry is associated with a data destination to which the processed data payload is to be sent. In this case, the method proceeds to 230 and the next entry is removed from the prefix, and the updated data packet is sent to the destination. Because in this case, the next entry is the last entry, the processed data payload, and any postfixes that were optionally added to the updated data packet by the plurality of data processing units, are provided to the destination.

Now, a specific example of a data processing system configured as a query processing engine is described. In general, there are many different formats in which data may be stored on volatile media, such as DDR, or non-volatile storage media, such as HDD and SSD. The data may be stored as structured data in binary or text row-based data or binary or text column-based data. When data is stored as binary data, it is often desirable to convert it to human-readable text-based data for logging or display. When information is acquired as text-based data, it is often desirable to store it as binary data to reduce the data footprint, organize it using a data structure, or prepare it for data access operations such as search operations.

Figure 3:
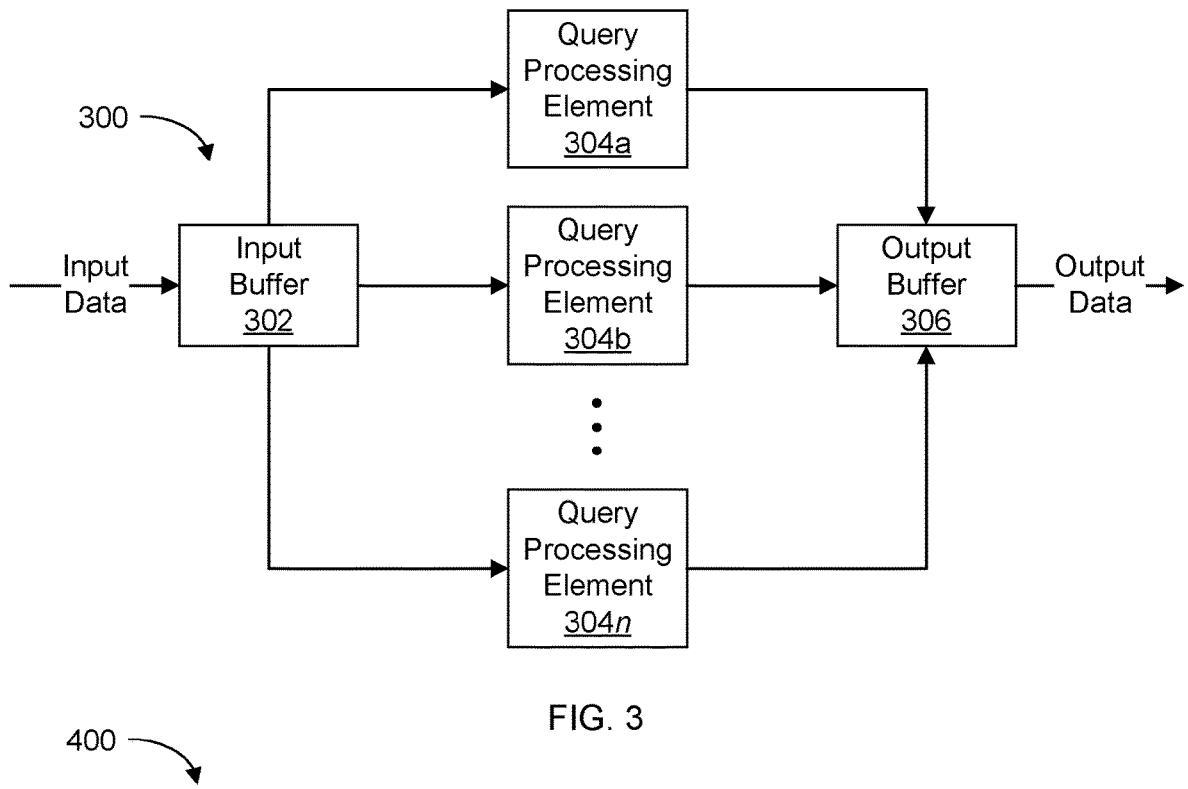
FIG. 3 is a schematic representation of an example query processing engine in accordance with another embodiment of the present disclosure.

Referring to FIG. 3, a schematic representation of an example query processing engine 300 is shown. The example query processing engine 300 may be configured to interpret the many different storage formats while supporting reformatting, filtering, and analytics on the data.

To perform query and analytic operations on a broad range of storage formats, the example query processing engine 300 may be configured to convert the input data format into an internal tokenized binary data format. The tokenized binary data format can be optionally filtered and processed using pre-built or user-provided analytics functions to generate reduced tokenized binary data format. The reduced tokenized binary data format is passed to the output formatter to generate the user-specified data output format.

For example, in one example, a user may have binary data generated by a hardware appliance or provided from a data source in a user datagram protocol (UDP) packet. This binary data may be stored on a hardware storage system, and a log file may be maintained that includes a subset of the binary data, preferably in a human-readable format such as a comma-separated values (CSV) text file. The example query processing engine 300 may be configured to generate this CSV log file by converting the input UDP binary format into an internal tokenized binary format in an input formatter. Date filtering and analytics may then be performed on the binary tokenized data, resulting in a reduced data stream of binary tokenized data. This reduced stream of binary tokenized data from the data filter may be provided to an output formatter that converts the binary tokenized data into text-based CSV files.

In the example query processing engine 300, the input buffer 302 receives the raw input data at multiple bytes per clock cycle and provides it to the query processing elements 304a-n at a fixed rate. Each query processing elements 304a-n is configured to format the input data, perform data analytics, and format the output data provided to the output buffer 306 for a subset of the input data. The output buffer 306 receives the data from the parallel query processing elements and reconstructs it into a serial output stream, generating an output data rate as multiple bytes per clock cycle.

Figure 4:
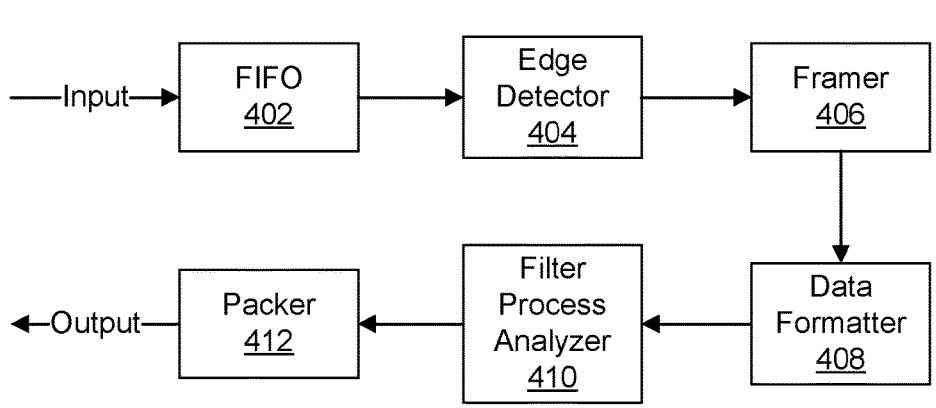
FIG. 4 is a schematic representation of an example of a query processing element in accordance with an embodiment of the present disclosure.

Referring to FIG. 4, a schematic representation of example query processing element 400 suitable for incorporation into a query processing engine, such as the example query processing engine 300 shown in FIG. 3, is shown. The query processing element 400 may be configured to perform a query operation that allows for a broad class of storage formats to be interpreted while providing reformatting, filtering, and analytics support. The example query processing element 400 shown in FIG. 4 includes a first-in-first-out buffer (FIFO) 402, an edge detector 404, a framer 406, a data formatter 408, a filter process analyzer 410, and a packer 412.

The FIFO 402 may be configured to accept data at a given input rate and, optionally, may output the data at a different rate. The FIFO 402 may read the input data from a predetermined starting address from an input buffer, such as input buffer 302, and may continue to read data until the query operation is complete. Typically, in query processing engines configured with multiple query processing elements parallel, such as the example query processing engine shown in FIG. 3, each FIFO 402 begins reading input data at equally distributed starting addresses in the input buffer. However, for some data formats with fixed record size, or offsets that can be calculated, the FIFO 402 may start at predetermined or calculated offsets from the record layout in the input buffer. The FIFO 402 may read row-based data formats or text-based input data like CSV files until an integral number of rows has been input. Data from the FIFOs 402 are provided to the edge detector 404. The address range for each FIFO 402 may be configured to be wide enough to include at least one complete record in the address range.

The edge detector 404 may be configured to search for record edges or boundaries in the given input format. Record edges define the start and end of new data records. For static input data formats without variable length fields, the edge detector 404 may pass the data directly to the framer 406 if the FIFO 402 is already providing full records to the edge detector 404. In the case of input data with variable length fields, including text-based formats like CSV or JSON, or binary formats with fields with variable-length arrays and embedded text, the edge detector 404 determines where new records begin and end in the input stream. For example, in the case of a CSV file, the edge detector may search for the end of line indications in the data stream. The edge detector 404 then processes the data by removing the portion of the data before a detected starting edge and provides the remainder to the framer 406 until the end of the record is reached.

The framer 406 may be configured to break records into fields, as provided by an input format specification. The framer 406 may perform a scrub on the input data fields, for example, to remove undesired whitespace from numerical data, remove string quotations, and error check the characters in the text-based data stream. If erroneous data is detected in a record field, the framer 406 may blank the field with an appropriate data type and provide an error message to the data formatter 408. The framer 406 may also perform a pre-filtering operation to remove all fields from the data stream that are not used in analytics or data output.

The data formatter 408 may be configured convert data from the input format to the internal format utilized by the filter/analyser 410. For example, the data formatter 408 may reformat binary for numerical data and text for string data. In the case of input binary numerical data, no conversion may be necessary in certain operations, and the data formatter 408 may pass the data to the filter/analyser 410 directly. In the case of textual, numerical data, the data formatter 408 may convert the data to the appropriate type such as, for example, to integer data, before providing the reformatted data to the filter/analyzer 410. The data formatter 410 may be configured to be endianness-aware and text encoding aware, such as, for example, Unicode or ASCII aware.

The filter/analyzer 410 performs an algorithm-specific operation to reduce the data packet to an interesting subset. For example, the filter/analyzer 410 may implement a filter to analyze stock transactions for specific ticker symbols, with trading volumes that exceed a threshold in a time interval. In another example, the filter/analyzer may perform a structured query language (SQL) query on a transactional database.

In general, the filter/analyser 410 may comprise multiple filter/analysers operating in parallel. In this case, each filter/analyser operates on a portion of the data, and the filter/analysers may output data at different times. Therefore, it may be desirable to include a packer 412 that is configured to organize and reconstruct the outputs from the parallel filter/analysers to form an output in which the data is in an order that corresponds to the order of the input data.

In some applications, it may be desirable for the query processing elements to share information. For example, the input data may include a block of data, such as, for example, a header, that may provide information for understanding or decoding the subsequent data stream. The input buffer 302 of the query processing engine 300 shown in FIG. 3 may be configured to provide a shared memory space where different query processing elements 304a-n can store such shared data. This shared memory space may also be used for other communication between the query processing elements 304a-n.

In some applications, the edges between subsequent data records included in the input data may not be apparent to the input buffer 302. One such example of such input data is text-based JSON input files. In such cases, the input buffer 302 may send overlapping data blocks of predetermined sizes to query processing elements 304a-n. In each query processing element 304a-n, the edge detectors 404 may be configured to discard the records for which precise boundaries or edges cannot be found. For example, the edge detector 404 of the first query processing element 302a-n to receive a block of the input data finds clear boundaries for the first and subsequent data record. When the edge detector 404 in other query processing elements 302a-n finds its first edge, it may send the edge location to the query processing element 302a-n that received the previous block of input data. This way, the previous query processing element 302a-n may determine, based on the receive edge location, where to stop processing its block of input data. The size of the data overlap between blocks may be chosen to be larger than the biggest possible data record.

The query processing element 400 shown in FIG. 4 is an example of a hard control query processing element in that the data flows through the FIFO 402, edge detector 404, framer 406, data formatter 408, filter/analyser 410, and packer 412 of the query processing element 400 in the predetermined order shown in FIG. 4. Thus, the hard control query processing element 400 is configured for performing only one specific data processing function, i.e., a query operation.

In another example, the data processing system of the present disclosure may be configured to provide a query processing element that is soft controlled. In this manner, the data processing system may perform the functionality that is hardcoded into the query processing element 400, but also may have the flexibility to perform the functions of the query operations in a different order, or to omit certain steps, that is not possible in a hard controlled query processing element. Further, depending on the data processing units included in the data processing system, may have the flexibility to perform other data processing operations in addition to query operations. This is because, unlike the hard control query processing element 400 in which the functions are performed based on how the different elements are hardcoded into the query processing element 400, the functions that are performed, and the order they are performed in, are determined by the prefix that is included with the input data, as described previously. By changing the prefix included with the data, the sequence of data processing units that the interconnect unit sends the input data to is changed, providing this flexibility.

Figure 5:
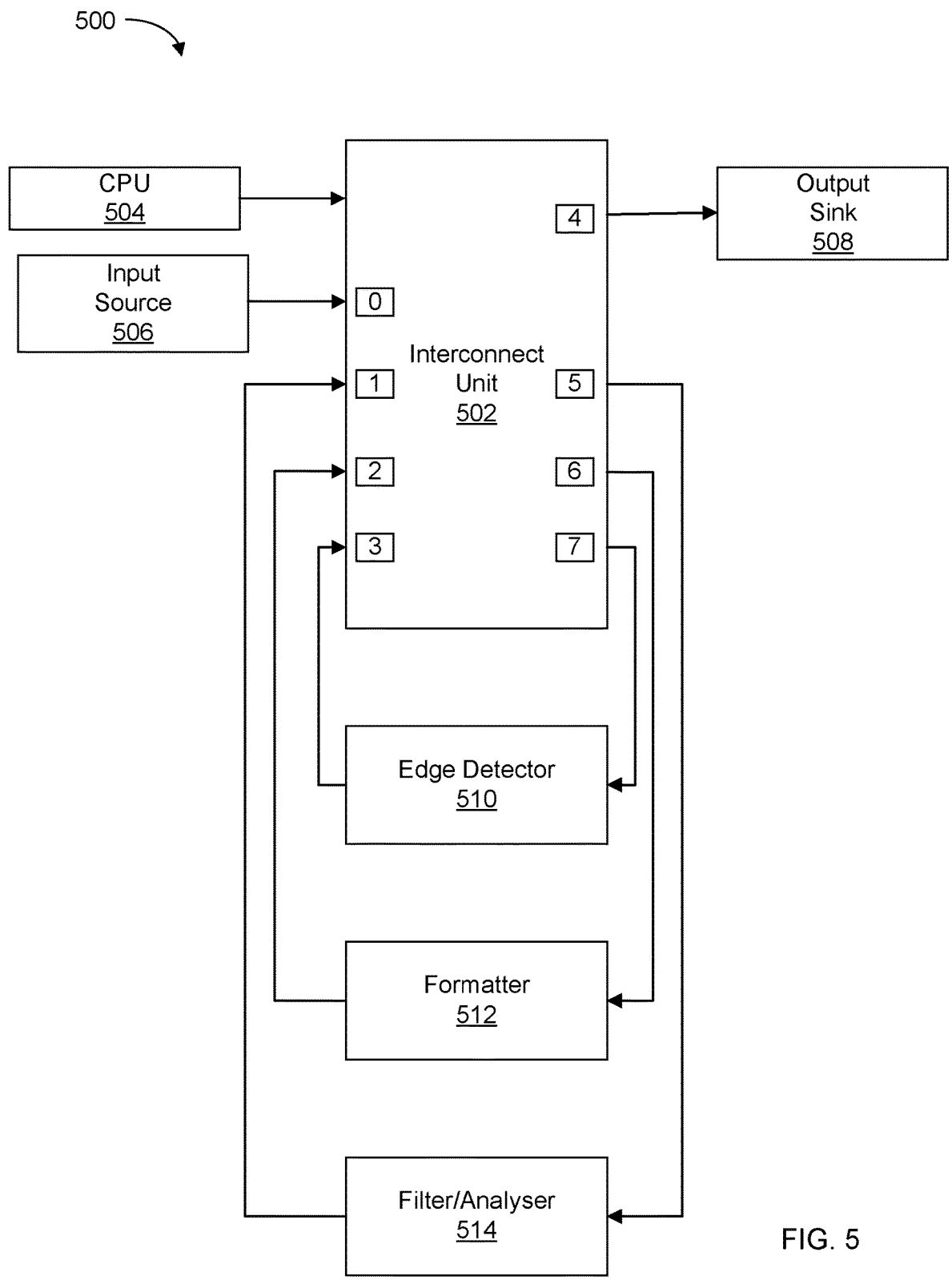
FIG. 5 is a schematic representation of an example query processing element in accordance with another embodiment of the present disclosure.

Referring to FIG. 5, an example data processing system 500 configured to perform a query operation is shown. The data processing system 500 includes an interconnect unit 502, a target CPU 504, an input data source 506, and an output data sink 508. The interconnect unit 502, the target CPU 504, the input data source 506, and the output data sink 508 may be substantially similar to the interconnect unit 102, the target CPU 106, the I/O buffer 108, and the destination 112, respectively, of the example data processing unit 100 shown in FIG. 1 and described previously, and therefore the interconnect unit 502, the target CPU 504, the input data source 506, and the output data sink 508 are not further described herein.

The example data processing system 500 shown in FIG. 5 also includes three data processing units: an edge detector 510, a formatter 512, and a filter/analyser 514 which may be configured to perform functions similar to the edge detector 404, formatter 408, and filter/analyser 410, respectively, previously described with reference to FIG. 4.

The example data processing system 500 shown in FIG. 5 is an example in which the components of the data processing system 500 are provided in a single integrated circuit such that each of the components are connected to the interconnect unit 502 via a unique port. In this example, the input source 506 and the outputs of the edge detector 510, the formatter 512, and the filter/analyser 514 connected to source ports (port 0, port 1, port 2, and port 3, respectively. The inputs of the output sink 508, the edge detector 510, the formatter 512, and the filter/analyser 514 are connected to destination ports (port 4, port 5, port 6, and port 7, respectively).

In this example the input source 506 may include input or data generating blocks, including but not limited to data in RAM, which may be accessible to the target CPU 504, a bus such as PCIe, a random number generator, or any other block of the data processing system 500. The output sink consumes data and may include RAM, which may be accessible to the target CPU 504, a bus such as PCIe, or other blocks in the system.

Figure 6A:
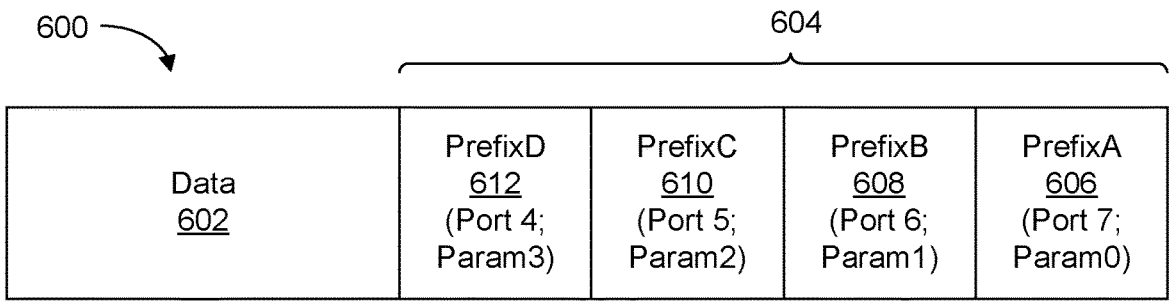
FIGS. 6A-6I show schematic representations of data packets in accordance with an embodiment of the present disclosure.

With reference to FIGS. 6A-1, an example of how data may be routed in the data processing system 500 by the interconnect unit 502 using prefixes will be described. In this example, the data operation that is performed by providing data from the input source 506 to the edge detector 510. The output data from the edge detector 510 is then provided to the interconnect unit 502, which passes the output data to the formatter 512. The output data from the formatter 512 is provided to interconnect unit 502, which passes the output data to the filter/analyser 514. The final output data from the filter/analyser 514 is provided to the interconnect unit 502, which sends the final output data to the output sink 508. In the present example, each of the operations performed by the edge detector 510, the formatter 512, and the filter/analyser 514 has associated parameter data. However, not every data operation may include as associated parameter.

Initially, a data packet 600 is generated by the interconnect unit 502. The data packet 600 includes a data payload 602 that is received from the input source 506 and a prefix 604 that is generated by the target CPU 504 as described previously. The prefix 604 provides the routing of the data payload 602 utilized to perform the data operation. The example prefix 604 shown in FIG. 6A includes a PrefixA 606 entry associated with the edge detection operation, which includes an address, Port 7, which is the port of the interconnect unit 502 connected to the edge detector 510 and includes a parameter, Param0, to be used when performing the edge detection operation. The prefix 604 includes a PrefixB 608 entry associated with the formatting operation, which includes an address, Port 6, which is the port of the interconnect unit 502 connected to the formatter 512, and includes a parameter, Param1, to be used when performing the formatting operation. The prefix 604 includes a PrefixC 610 entry associated with the filtering/analysing operation, which includes an address, Port 5, which is the port of the interconnect unit 502 connected to the filter/analyser 514, and includes a parameter, Param2, to be used when performing the filtering/analysing operation. The prefix 604 includes a PrefixD 612 associated with sending the filtered/analysed data to the output sink 508, which includes an address, Port 4, which is the port of the interconnect unit 502 connected to the output sink 508, and includes a parameter, Param3, to be used when sending the final data to the output sink 508.

Because the data packet 600 shown in FIG. 6A is the initial data packet that has not yet passed through any of the data processing units of the data processing system 500, the example data packet 600 does not include a postfix. As will be seen, postfixes may be appended onto data packets by data processing units before sending the data packet back to the interconnect unit 502.

In the present disclosure, the data packet currently being routed by the interconnect unit 502 may be referred to herein as the "current data packet", and the data payload and the prefix included in a current data packet may be referred to herein as the "current data payload" and the "current prefix", respectively.

Figure 6B:
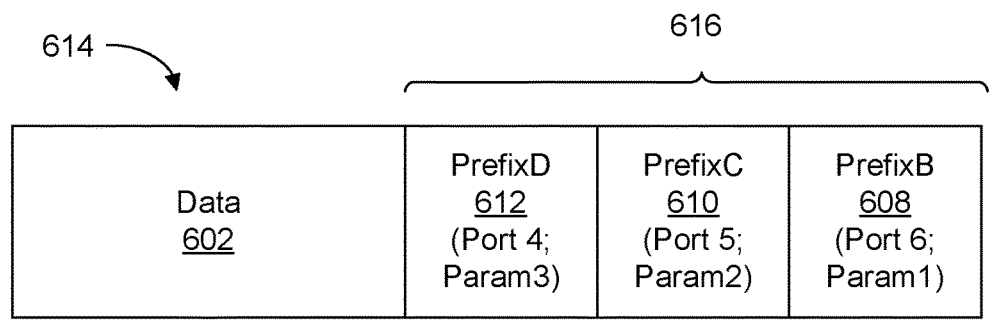

As noted above, when the interconnect unit 502 receives the data packet 600, the next entry of the prefix 604, in this example PrefixA 606, is removed to generate an updated data packet 614 that includes an updated prefix 616, as shown in FIG. 6B. The updated data packet 614 is then sent to a data processing unit based on the address in the removed next entry, together with any parameter included in the next entry. In this case, based on the next entry, PrefixA 606, the updated data packet 614 is sent to the edge detector 510 via Port 7 together with the parameter Param0. In the case of an edge detecting operation, the parameter Param0 may include information, which may be referred to as a hint, of the expected alignment of the data blocks included in the data payload 602.

Figure 6C:
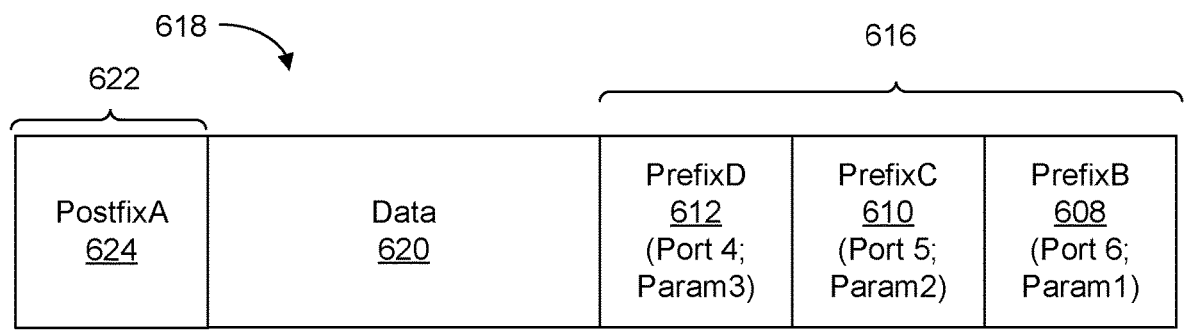

The edge detector 510 then performs the edge detection operation on the data payload 602 utilizing the parameter Param0 to generate a processed data payload 620. The edge detector 510 prepends the updated prefix 616 to the processed data payload 620. The processed data payload 620 may include the data included in the data payload 602 starting at the first edge as determined by the edge detector 510, and the data of data payload 602 located before the first edge is discarded. The edge detector 510 may also generate a postfix entry, PostfixA 624, and appends the PostfixA 624 as a postfix 622. The PostfixA 624 entry may include information related to the edge detection operation such as, for example, information associated with the edge location. The processed data payload 620, the updated prefix 616, and the postfix 622 form an updated data packet 618, shown in FIG. 6C, that is sent by the edge detector 510 to the interconnect unit 502 via port 3.

Figure 6D:
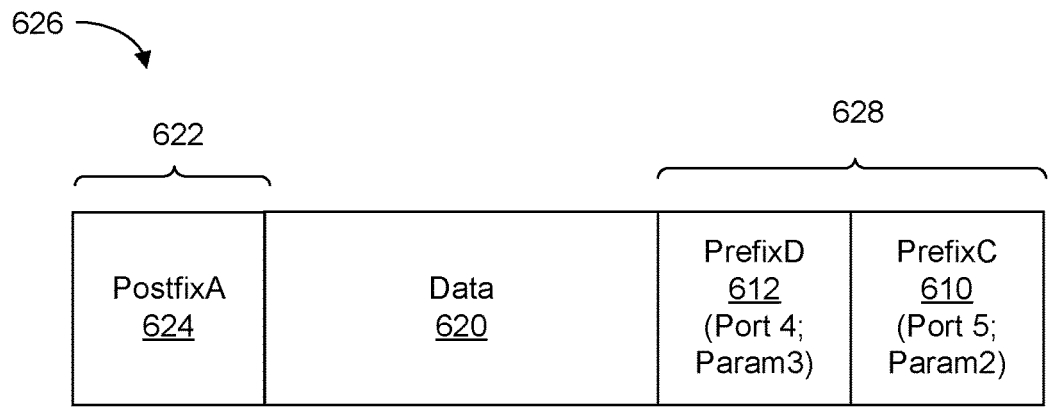

Once the updated data packet 618 is received at the interconnect unit 502, it will become the new current data packet, and the above process is repeated. Namely, the interconnect unit 502 removes the next entry from the prefix 616, PrefixB 608, to generate the updated data packet 626 shown in FIG. 6D that includes the data payload 620, the postfix 622, and an updated prefix 628. The updated data packet 626 is sent to the formatter 512 via port 6 together with the parameter Param1, based on the determined next entry PrefixB 608. In the case of a formatting operation, the parameter Param1 may include a definition of the data structure for the underlying data included in the data payload 620, which may be, for example, C structure, JSON file, SQL table, or the like. The parameter Param1 may also include information specifying, for example, which fields are integer, floating-point, strings, dates, etc.

Figure 6E:
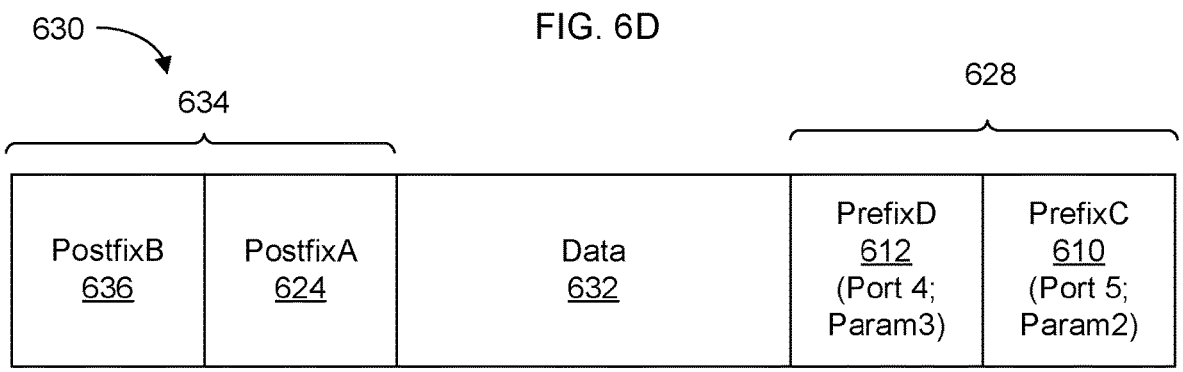

The formatter 512 receives the updated data packet 626 and performs a formatting operation on the data payload 620 utilizing the received parameter Param1 to generate a processed data payload 632. The processed data payload 632 may include reformatted data generated by the formatting operation. The formatter 512 may also generate a postfix entry, PostfixB 636 that includes information about the formatting operation that was performed such as, for example, the number of records that were converted during the formatting operation. The formatter appends the postfix entry PostfixB 636 to the postfix 622 to generate an updated postfix 634. The formatter 512 then appends the updated postfix 634 and prepends the prefix 628 to the processed data payload 632 to generate the updated data packet 630 shown in FIG. 6E. The updated data packet 630 is sent from the formatter 512 to the interconnect unit 502 via port 2.

Figure 6F:
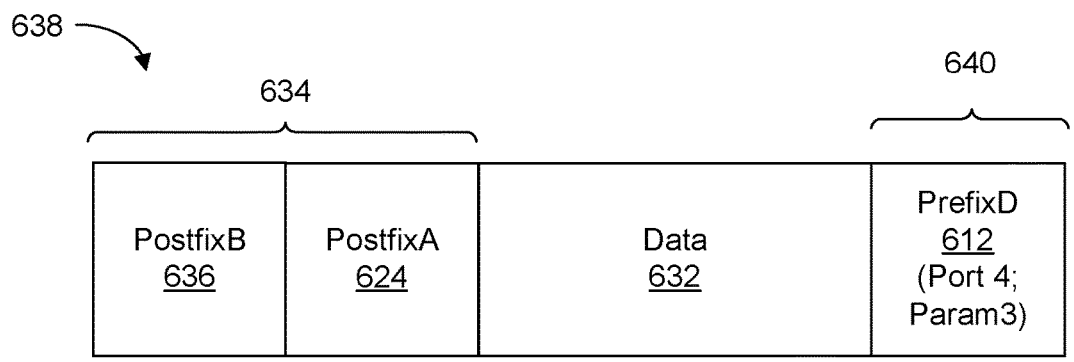

Again, when the updated data packet is received at the interconnect unit 502, it becomes the new current data packet and the above-described process is repeated. The interconnect unit 502 removes the next entry of the prefix 628, which is PrefixC 610, to generate the updated prefix 640 of the updated data packet 638 shown in FIG. 6F. The updated data packet 638 is sent to the filter/analyser 514 via port 5 together with the parameter Param2 based on the next entry PrefixC 610. In the case of a filter/analysing operation, the parameter Param2 may include, for example, parameters upon which the data is filtered according to. The parameter Param2 may be, for example, an SQL select command in the case of a filter/analyser 514 configured to perform an SQL query.

Figure 6G:
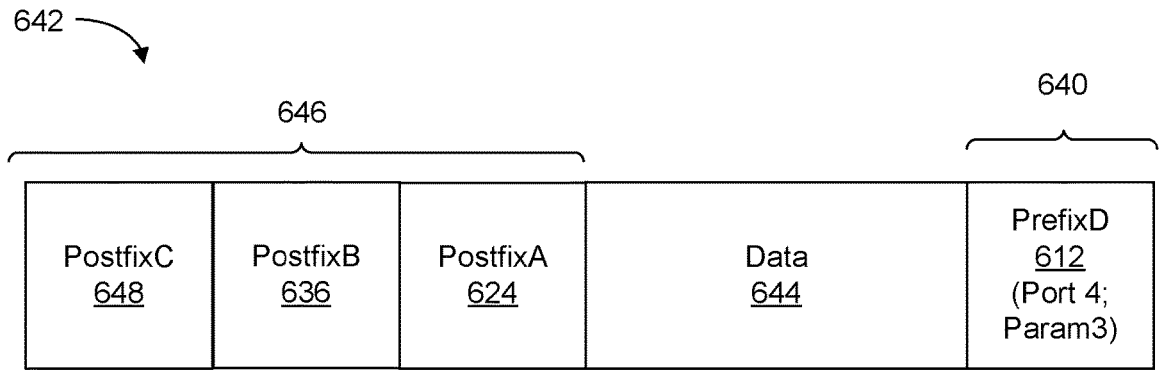

The filter/analyser 514 then performs filtering/analysing on the data payload 632 utilizing the parameter Param2 to generate the processed data payload 644. The processed data payload 644 may include filtered data based on the data payload 632. The filter/analyzer 514 may generate a postfix entry PostfixC 648, which is appended to postfix 634 to generate an updated postfix 646. The postfix entry PostfixC 648 includes information regarding the filtering/analysing operation that was performed such as, for example, the number of records that were removed and the number of matches. The prefix is prepended to the processed data payload 644 and then updated postfix 646 is appended to the processed data payload 644 to generate the updated data packet 642 shown in FIG. 6G. The updated data packet 642 is sent by the filter/analyser 514 to the interconnect unit 502 via port 1.

Figure 6H:
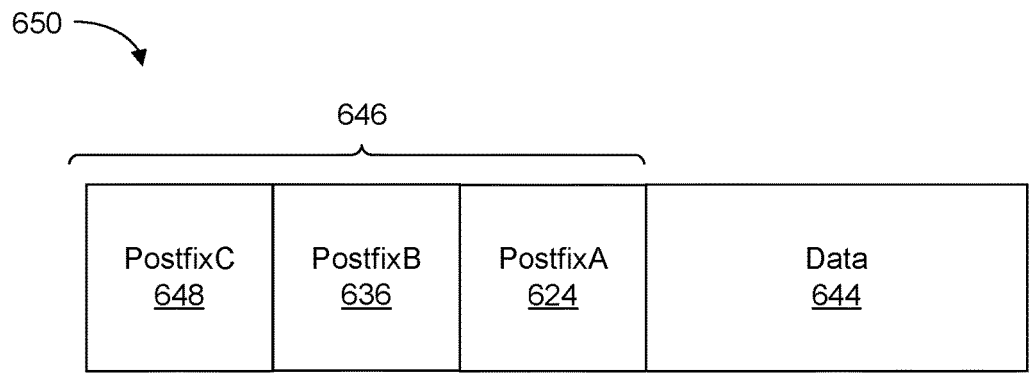
Figure 6I:
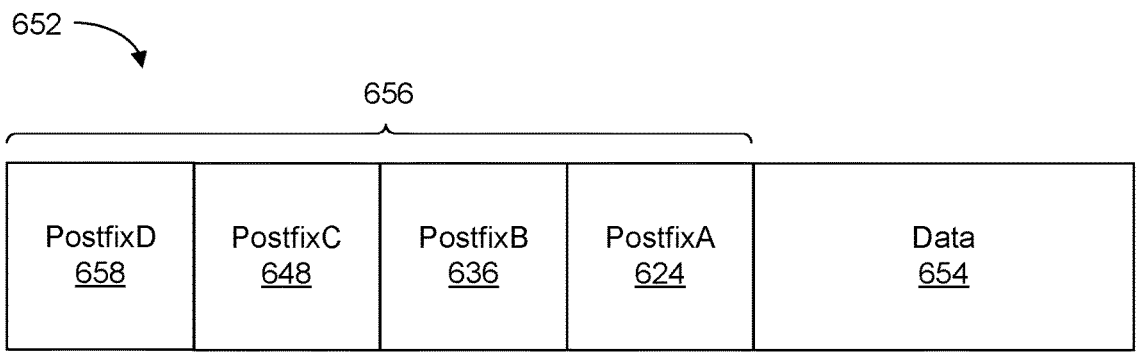

A final time, the interconnect unit 502 performs the above-described process on the updated data packet 642, which becomes the new current data packet. Namely, the next entry, Prefix D 612, is removed to generate the updated data packet 650 shown in FIG. 6H, which includes the data payload 644. An updated postfix 656 that includes PostfixD 658 is generated by the interconnect unit 502 and may include, for example the number of output bytes of the data payload 654. The updated postfix 656 and the data payload 654 form the updated data packet 652 shown in FIG. 6I. The updated data packet 652, which includes the updated postfix 656 and the data payload 654 is sent to the output sink 508 via port 4 together with the parameter Param3. In an example, the parameter Param3 provided to the output sink 508 may include a maximum limit to the amount of expected output data.

As previously described, in some embodiments one or more of the data processing units of the data processing system, such as some of the data processing units 104 of the example data processing system 100, may be configured to revise the prefix of a received data packet. The data processing unit may be configured to revise the prefix by, for example, adding an additional entry to the prefix, removing an entry from the prefix, revising the order of the entries included in the prefix, or revising an entry of the prefix to change, for example, the address included in the entry. An additional entry may be added to the prefix if, for example, an additional data operation is desired, such as for example, reformatting, decompressing or compressing, or decrypting the data payload in the data packet prior to, or after, performing subsequent operations. An entry may be removed if the data operation associated with the entry is determined to not be desired, such as removing an entry associated with a reformatting operation in a situation where the data processing unit determines that the data payload in the data packet is already in the desired format, for example determining that text to binary data conversion is not required if the data is already binary formatted. The order to the entries in the prefix may be revised if, for example, greater efficiencies may be achieved by rescheduling subsequent data operations based on the availability of other data processing units that are intended to perform subsequent operations. An entry of the prefix may be revised to, for example, change the address of the data processing unit that performs the data operation associated with the entry if, for example, there are multiple data processing units configured to perform that data operation, and another of the data processing units is available to perform the data operation and the data processing unit associated with the original address included in the entry is not available due to, for example, being busy processing other data.

The decision-making process for revising the prefix may be controlled by, for example, machine learning algorithms, custom hardware, or software implemented in a data processing unit configured to revising the prefix. In some examples, the data processing unit may be configured solely to reschedule based on the data payload included the data packet that is received, or based on information included in the postfix of the received data packet, which information is related to previous data operations.

Figure 7A:
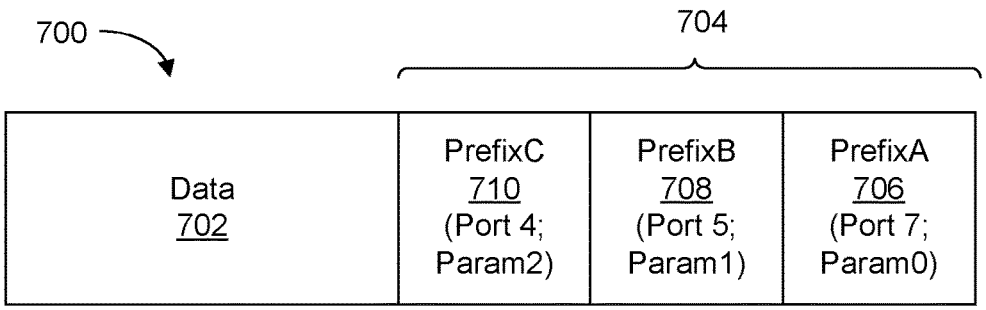
FIG. 7A-7C show schematic representations of data packets in accordance with another embodiment of the present disclosure.
Figure 7B:
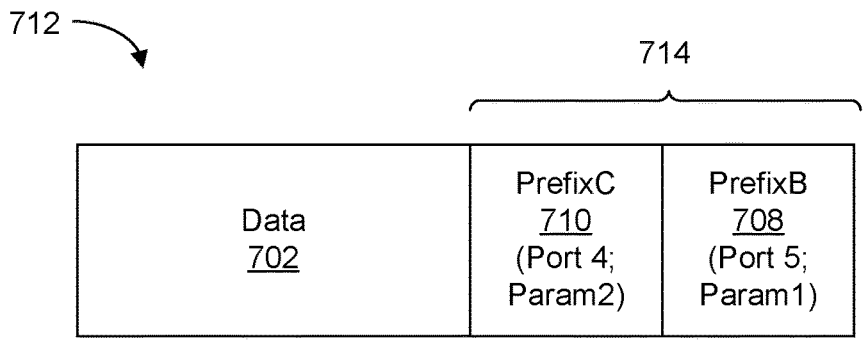
Figure 7C:
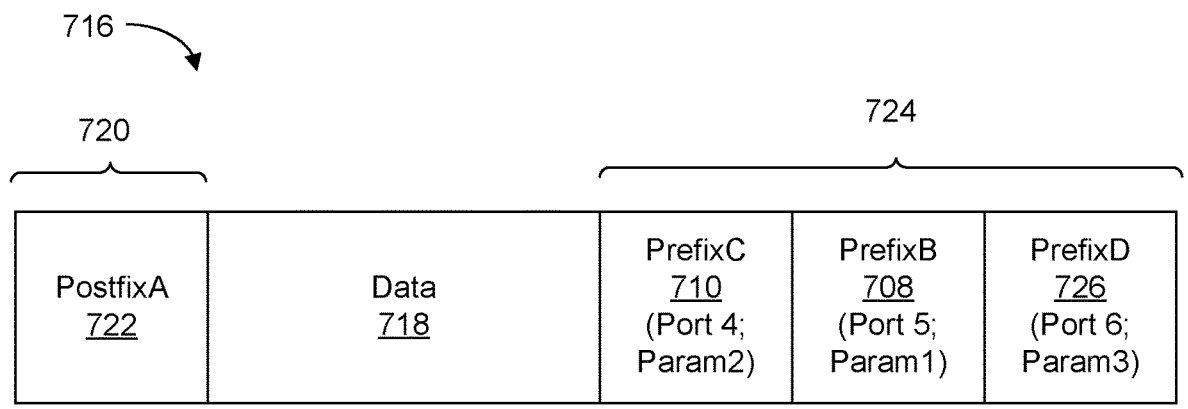

Referring now to FIGS. 7A to 7C, schematic representations of example data packets are shown to illustrate an example in which a data processing unit revises a prefix of a data packet. In the example, the prefix is revised by the edge detector 510 of the data processing system 500 described previously. The data operation for this example includes performing an edge detection operation by the edge detector 510, followed by a filtering/analysing operation performed by the filter analyser 514, followed by sending the filtered/analysed data to the output sink 508. To perform this data operation, a data packet 700 is generated which includes the data payload 702 and a prefix 704, as shown in FIG. 7A. The prefix includes a PrefixA 706 entry associated with the edge detection operation, and includes address Port 7 associated with the edge detector 510, a PrefixB 708 entry associated with the filtering/analysing operation, and includes address Port 5 associated with the input to the filter/analyser 514, and a PrefixC 710 entry associated with sending the output data to the output sink 508, and includes address Port 4 associated with the output sink 508.

As described previously, the interconnect unit 502 removes a next entry in the prefix 604, in this case the PrefixA 706 entry, to generate an updated prefix 714 that is included in an updated data packet 712, as shown in FIG. 7B. The interconnect unit 502 sends the updated data packet 712, which includes the data payload 702 and the updated prefix 714 to the edge detector 510 via Port 7 together with the parameter Param1.

In this example, the edge detector 510 may be configured to determine whether the data payload 702 is text or binary data. For example, it may be desirable that the filtering/analysing operation is performed on binary data only, but the data included in the data payload 702 may include both text and binary data. Thus, if the edge detector 510 determines the data payload 702 includes text data, the edge detector 510 is configured to cause a formatting operation to be performed before the filtering/analysing operation is performed to convert the text data to binary data.

In this example, the edge detector 510 has determined that the data payload 702 includes text data, and the edge detector 510 provides the processed data packet 716 as shown in FIG. 7C, which includes the processed data payload 718, a postfix 720 including PostfixA 722 entry which includes information related to the edge detection, such as the location of the detected edge, and the prefix entries received from the interconnect unit, i.e., the PrefixB 708 and the PrefixC 710 entries. These portions are similar to the processed data packet 618 described previously with reference to FIG. 6C. However, the processed data packet 716 also includes an updated prefix 724 that includes an additional prefix entry PrefixD 726 associated with the formatting operation to be performed by the formatter 512. The PrefixD 726 includes an address, Port 6, which is the port of the interconnect unit 502 connected to the input of the formatter 512, and a parameter, Param3.

In this way, a formatting operation is added to the sequence of data operations such that data is formatted to be, in this example, entirely in binary data, prior to performing the filtering/analysing operation.

The present disclosure relates to utilizing an interconnect unit, separate from a target CPU, to performing routing of data between data processing units and an output sink in a data processing system, which may free up the target CPU processing resources and increase efficiency of the data processing system. The present disclose describes utilizing prefixes included in a data packet that includes a data payload, where a sequentially ordered list of data operations. The sequentially ordered list of data operations are provided by the prefix including, for each data operation, an associated prefix entry that includes an address of the data processing unit that will perform that data operation, and optionally, a parameter to be used by the data processing unit when performing the data operation. In some embodiments, one or more of the data processing units may be configured to revise the prefix to alter the sequentially ordered list of data operations.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A data processing system for performing a sequence of data operations, comprising:
   a plurality of data processing circuits each configured to perform a respective data operation;
   a target central processing unit (CPU) configured to generate a current prefix, the current prefix including a current sequentially ordered list of the plurality of data processing circuits corresponding to the sequence of data operations;
   an interconnect circuit that is separate from the target CPU, the interconnect circuit in communication with the plurality of data processing circuits and the target CPU, the interconnect circuit configured to:
   receive from the target CPU the current prefix;
   receive from an input data source a current data payload to be processed;
   generate a current data packet by prepending the current prefix to the current data payload; and
   sequentially send the current data packet to the plurality of data processing circuits by:
   i) determining, based on a next entry in the current sequentially ordered list included in the current prefix of the current data packet, a one of the plurality of data processing circuits associated with the next entry;
   ii) removing the next entry and an associated set of parameters from the current prefix to generate an updated prefix;
   iii) replacing the current prefix with the updated prefix in the current data packet;
   iv) sending the current data packet to the one of the plurality of data processing circuits associated with the next entry in the current sequentially ordered list included in the current prefix, together with the associated set of parameters;
   v) receiving from the one of the plurality of data processing circuits an updated data packet including the updated prefix and a processed data payload generated by the one of the plurality of data processing circuits using the current data payload and the associated set of parameters;
   vi) in response to determining that a next entry in the updated prefix is associated with any of the plurality of data processing circuits, repeating steps i) to v) using the updated data packet as the current data packet with the updated prefix being the current prefix; and
   vii) in response to determining that the next entry in the updated prefix is associated with a data destination, removing the next entry from the updated prefix in the updated data packet and sending the updated data packet with the next entry removed to the data destination;
   wherein each of the plurality of data processing circuits is configured to:
   receive the current data packet and the associated set of parameters from the interconnect circuit;
   perform a data operation on the current data payload included in the current data packet to generate the processed data payload; and
   send the updated data packet including the processed data payload and the updated prefix to the interconnect circuit;

wherein:
each entry in the current sequentially ordered list comprises an address of the one of the plurality of data processing circuits associated with that entry;
the plurality of data processing circuits comprise two or more data processing circuits configured to perform a same data operation;
a first address in the current sequentially ordered list is a virtual address associated with the same data operation; and
when the next entry in the current sequentially ordered list comprises the first address, the interconnect circuit being configured to send the current data packet to the one of the plurality of data processing circuits associated with the next entry in the current sequentially ordered list comprises the interconnect circuit being configured to:
determine an available one of the two or more data processing circuits configured to perform the same data operation;
replace the first address in the next entry with an actual address of the available one of the two or more data processing circuits configured to perform the same data operation; and
send the current data packet that includes the actual address to the available one of the two or more data processing circuits.

2. The data processing system of claim 1, wherein:
the current prefix includes a corresponding set of parameters for each entry in the current sequentially ordered list;
the interconnect circuit configured to send the current data packet to the one of the plurality of data processing circuits associated with the next entry comprises the interconnect circuit configured to send the current data packet to the one of the plurality of data processing circuits associated with the next entry together with the corresponding set of parameters; and
the one of plurality of data processing circuits being configured to perform the data operation on the current data payload comprises the one of the plurality of data processing circuits being configured to perform the data operation on the current data payload utilizing the corresponding set of parameters.

3. The data processing system of claim 1, wherein:
each of the plurality of data processing circuits is further configured to generate a postfix that includes information associated with a status of the data operation performed by that data processing circuit; and
each of the plurality of data processing circuits being configured to send the updated data packet to the interconnect circuit comprises each of the plurality of data processing circuits sending the postfix together with the processed data payload and the updated prefix as the updated data packet.

4. The data processing system of claim 3, wherein:
the current data packet includes a current postfix;
the interconnect circuit being configured to send the current data packet to the one of the plurality of data processing circuits associated with the next entry comprises the interconnect circuit sending the current data payload, the updated prefix, and the current postfix; and
each of the plurality of data processing circuits being configured to generate the postfix comprises each of the plurality of data processing circuits adding a postfix that includes information associated with a status of the data operation performed by that data processing circuit to the current postfix received from the interconnect circuit to generate an updated postfix.

5. The data processing system of claim 4, wherein:
the interconnect circuit being configured to receive the updated data packet from the one of the plurality of data processing circuits comprises the interconnect circuit being configured to receive the updated postfix together with the processed data payload and the updated prefix as the updated data packet; and
the interconnect circuit being configured to repeat steps i) to v) using the updated data packet as the current data packet with the updated prefix being the current prefix comprises the interconnect circuit being configured to repeat steps i) to v) using the updated postfix received from the one of the plurality of data processing circuits as the current postfix in the current data packet.

6. The data processing system of claim 1, wherein:
at least one of the plurality of data processing circuits is further configured to revise the updated prefix received from the interconnect circuit to generate a revised prefix, the revised prefix including at least one of a revised sequentially ordered list or a revised set of parameters associated with an entry in the current sequentially ordered list; and
the at least one of the plurality of data processing circuits being configured to send the updated data packet including the processed data payload and the updated prefix to the interconnect circuit comprises including the revised prefix as the updated prefix in the updated data packet.

7. The data processing system of claim 1, wherein a second address of the one of the plurality of data processing circuits associated with a given entry comprises a port number associated with a port of the interconnect circuit that is connected to the one of the plurality of data processing circuits associated with the given entry.

8. A method for performing a sequence of data operations in a data processing system having a target central processing unit (CPU), an interconnect circuit separate from the target CPU, and a plurality of data processing circuits, the method comprising:
generating, by the target CPU, a current prefix, the current prefix including a current sequentially ordered list of the plurality of data processing circuits corresponding to the sequence of data operations;
receiving, at the interconnect circuit, the current prefix from the target CPU;
receiving, at the interconnect circuit, from an input data source a current data payload to be processed;
generating, by the interconnect circuit, a current data packet by prepending the current prefix to the current data payload; and
sequentially sending, by the interconnect circuit, the current data packet to the plurality of data processing circuits by:
i) determining, by the interconnect circuit, based on a next entry in the current sequentially ordered list included in the current prefix of the current data packet, a one of the plurality of data processing circuits associated with the next entry;
ii) removing, by the interconnect circuit, the next entry and an associated set of parameters from the current prefix to generate an updated prefix;
iii) replacing, by the interconnect circuit, the current prefix with the updated prefix in the current data packet;

iv) sending, by the interconnect circuit, the current data packet to the one of the plurality of data processing circuits associated with the next entry in the current sequentially ordered list included in the current prefix, together with the associated set of parameters;
v) receiving, by the interconnect circuit, from the one of the plurality of data processing circuits an updated data packet including the updated prefix and a processed data payload generated by the one of the plurality of data processing circuits using the current data payload and the associated set of parameters;
vi) in response to determining that a next entry in the updated prefix is associated with any of the plurality of data processing circuits, repeating, by the interconnect circuit, steps i) to v) using the updated data packet as the current data packet with the updated prefix being the current prefix; and
vii) in response to determining that the next entry in the updated prefix is associated with a data destination, removing, by the interconnect circuit, the next entry from the updated prefix in the updated data packet and sending, by the interconnect circuit, the updated data packet with the next entry removed to the data destination;

receiving, by the one of the plurality of data processing circuits, the current data packet and the associated set of parameters from the interconnect circuit;
performing, by the one of the plurality of data processing circuits, a data operation on the current data payload included in the current data packet to generate a processed data payload; and
sending, by the one of the plurality of data processing circuits, the updated data packet including the processed data payload and the updated prefix to the interconnect circuit;
wherein:
each entry in the current sequentially ordered list comprises an address of the one of the plurality of data processing circuits associated with that entry;
the plurality of data processing circuits comprise two or more data processing circuits configured to perform a same data operation;
a first address in the current sequentially ordered list is a virtual address associated with the same data operation performed by the two or more data processing circuits; and
when the next entry in the current sequentially ordered list comprises the first address, sending the current data packet to the one of the plurality of data processing circuits associated with the next entry in the current sequentially ordered list comprises:
determining, by the interconnect circuit, an available one of the two or more data processing circuits configured to perform the same data operation;
replacing the first address in the next entry with an actual address of the available one of the two or more data processing circuits configured to perform the same data operation; and
sending the current data packet to the available one of the two or more data processing circuits.

9. The method of claim 8, wherein:
the current prefix includes a corresponding set of parameters for each entry in the current sequentially ordered list;
sending, by the interconnect circuit, the current data packet to the one of the plurality of data processing circuits associated with the next entry comprises sending the current data packet to the one of the plurality of data processing circuits associated with the next entry together with the corresponding set of parameters; and
performing, by the one of the data processing circuits, a data operation on the current data payload comprises performing the data operation on the current data payload utilizing the corresponding set of parameters.

10. The method of claim 8, further comprises:
generating, by the one of the plurality of data processing circuits, a postfix that includes information associated with a status of the data operation performed by the data processing circuit; and
wherein sending, by the one of the plurality of processing circuits, the updated data packet to the interconnect circuit comprises sending the postfix together with the processed data payload and the updated prefix as the updated data packet.

11. The method of claim 10, wherein:
the current data packet includes a current postfix;
sending the current data packet to the one of the plurality of data processing circuits associated with the next entry comprises sending, by the interconnect circuit, the current data payload, the updated prefix, and the current postfix; and
generating the postfix comprises adding, by the one of the plurality of processing circuits, a postfix that includes information associated with a status of the data operation performed by the data processing circuit to the current postfix received from the interconnect circuit to generate an updated postfix.

12. The method of claim 11, wherein:
receiving the updated data packet from the one of the plurality of data processing circuits comprises receiving, by the interconnect circuit, the updated postfix together with the processed data payload and the updated prefix as the updated data packet; and
repeating steps i) to v) using the updated data packet as the current data payload with the updated prefix being the current prefix comprises repeating, by the interconnect circuit, steps i) to v) using the updated postfix received from the one of the plurality of data processing circuits as the current postfix in the current data payload.

13. The method of claim 8, further comprising, during at least one of the data operations, revising, by the one of the plurality of data processing circuits, the updated prefix received from the interconnect circuit to generate a revised prefix, the revised prefix including at least one of a revised sequentially ordered list or a revised set of parameters associated with an entry in the current sequentially ordered list; and
wherein sending the updated data packet including the processed data payload and the updated prefix to the interconnect circuit comprises including, by the one of the plurality of data processing circuits, the revised prefix as the updated prefix in the updated data packet.

14. The method of claim 8, wherein a second address of the one of the plurality of data processing circuits associated with a given entry comprises a port number associated with a port of the interconnect circuit that is connected to the one of the plurality of data processing circuits associated with the given entry.

* * * * *